(12) United States Patent
Svendsen

(10) Patent No.: US 6,553,856 B2
(45) Date of Patent: Apr. 29, 2003

(54) MOTOR VEHICLE WITH A TRANSMISSION

(75) Inventor: Vidar Svendsen, Kongsberg (NO)

(73) Assignee: LuK Lamellen und Kupplungsbau Beteiligungs KG, Buhl ( * ) Notice: Subject to any disclaimer, the term of this patent is extended or adjusted under 35 U.S.C. 154(b) by 0 days.

(21) Appl. No.: 09/933,469

(22) Filed: Aug. 17, 2001

(65) Prior Publication Data
US 2002/0026841 A1 Mar. 7, 2002

Related U.S. Application Data

(63) Continuation of application No. PCT/DE00/04158, filed on Nov. 23, 2000.

(30) Foreign Application Priority Data

Dec. 17, 1999 (DE) .......................................... 199 60 915

(51) Int. Cl.⁷ .............................................. F16H 59/60
(52) U.S. Cl. .......................................... 74/335; 701/52
(58) Field of Search ............................... 74/335, 336 R, 74/336.5, 337; 701/52

(56) References Cited

U.S. PATENT DOCUMENTS

| | | | | |
|---|---|---|---|---|
| 5,819,585 A | * | 10/1998 | Darnell | 74/335 |
| 6,035,734 A | * | 3/2000 | Le Van | 74/335 |
| 6,035,735 A | * | 3/2000 | Graf et al. | 74/335 |
| 6,085,139 A | * | 7/2000 | Nakauchi et al. | 701/52 |

FOREIGN PATENT DOCUMENTS

| | | |
|---|---|---|
| DE | 198 35 854 A 1 | 2/1999 |
| EP | 0 869 300 A1 | 10/1998 |
| FR | 2 767 571 | 8/1998 |

OTHER PUBLICATIONS

Article Titled: Navigationssystem als Datenbasis für ein adaptives Antriebsmanagement 180 ATZ Automobiltechnische Zeitschrift 98 (1996) Apr., No. 4, Stuttgart, DE (Germany) English Title: Navigation System For An Adaptive Management Driven Database.

* cited by examiner

*Primary Examiner*—Sherry Estremsky
(74) *Attorney, Agent, or Firm*—Darby & Darby

(57) ABSTRACT

A motor vehicle has a transmission with an automatic operating mode in which the transmission ratio is changed automatically by a control device and a manual operating mode in which the transmission ratio is changed by the driver by means of a ratio-selector device. The control device automatically switches from the manual to the automatic mode, e.g., when the driver makes or answers a call on a mobile telephone.

8 Claims, 3 Drawing Sheets

MOTOR VEHICLE WITH A TRANSMISSION

This is a continuation of international application Ser. No. PCT/DE00/04158, filed Nov. 23, 2000, the entire disclosure of which is hereby incorporated by reference.

BACKGROUND OF THE INVENTION

The present invention relates to a motor vehicle with an engine, a transmission with a device for changing the transmission ratio, a control device, and a ratio-selector device. The transmission has a first operating mode in which a change of the transmission ratio is initiated by the control device, and a second operating mode in which a change of the transmission ratio is initiated by the ratio-selector device.

Motor vehicles of this type are commonly known. The selection between the first and second operating mode is made by means of a switching element that is operated by the driver of the vehicle.

This has the inherent drawback that in order to switch from one operating mode to the other requires a deliberate act of the driver. This is inconvenient for the driver, and it often leads to situations where the operating mode is either left unchanged or is switched too late, e.g., because the driver may be inattentive or indisposed. As a result, the transmission remains in an operating mode that is inappropriate for the situation, which has serious negative consequences for the driving safety of the vehicle.

OBJECT OF THE INVENTION

The invention therefore has the objective of providing a motor vehicle in which the switch-over from one operating mode to the other does not require a deliberate act of the driver, so that when a switch of operating modes is needed, the driver will not necessarily be required to take action, and thus will not be caused by the aforementioned reasons to neglect the switch of operating modes.

This objective is desirable, because it not only increases the operating convenience for the driver, but it also significantly enhances the driving safety of the vehicle.

SUMMARY OF THE INVENTION

According to the invention, the foregoing objective is met by a motor vehicle of the type described above, wherein a switch-over between the first operating mode and the second operating mode can be performed automatically under the control of the control device.

Preferably, the control device directs the switch-over from one operating mode to the other in response to at least one signal.

In a preferred embodiment, a first signal causes a switch-over to the first operating mode where a shift of the transmission ratio is initiated by the control device, and a second signal causes a switch-over to the second operating mode where a shift of the transmission ratio is initiated by the ratio-selector device.

An advantageous embodiment of the invention provides the option of omitting the switch-over to the second operation mode. For example, in a case where the switch-over between operating modes is coupled to the operation of a car telephone by the driver, as will be discussed below in further detail, the transmission would remain in the first operating mode after a telephone call has been completed.

Preferably, the switch-over to the second operating mode through the second signal is left out, if the first operating mode was selected already before the first signal occurred.

There is an advantage, if the switch-over to the second operating mode, where ratio-changes are initiated by the ratio-selector device, is made without a simultaneous shift of the transmission ratio, so that the transmission ratio that was previously selected by the control device during operation in the first operating mode remains in effect.

A preferred embodiment of the invention is distinguished in that the first signal and the second signal are generated by an electronic accessory device, particularly a communication device such as a mobile telephone.

In an example of a preferred embodiment of the invention, the first signal (which initiates the switch-over to the first operating mode where transmission-ratio shifts are initiated by the control device) is at least representative of an incoming or outgoing telephone call that is either taking place or is intended by the driver.

Also with preference, the second signal (which initiates the switch-over to the second operating mode where transmission-ratio shifts are initiated by the ratio-selector device) is at least representative of a telephone call having been completed or of the driver's intent to end a telephone call.

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

A preferred embodiment of the invention will be described below in detail, based on the attached drawings, wherein.

DETAILED DESCRIPTION OF PREFERRED EMBODIMENTS

Figure 1:
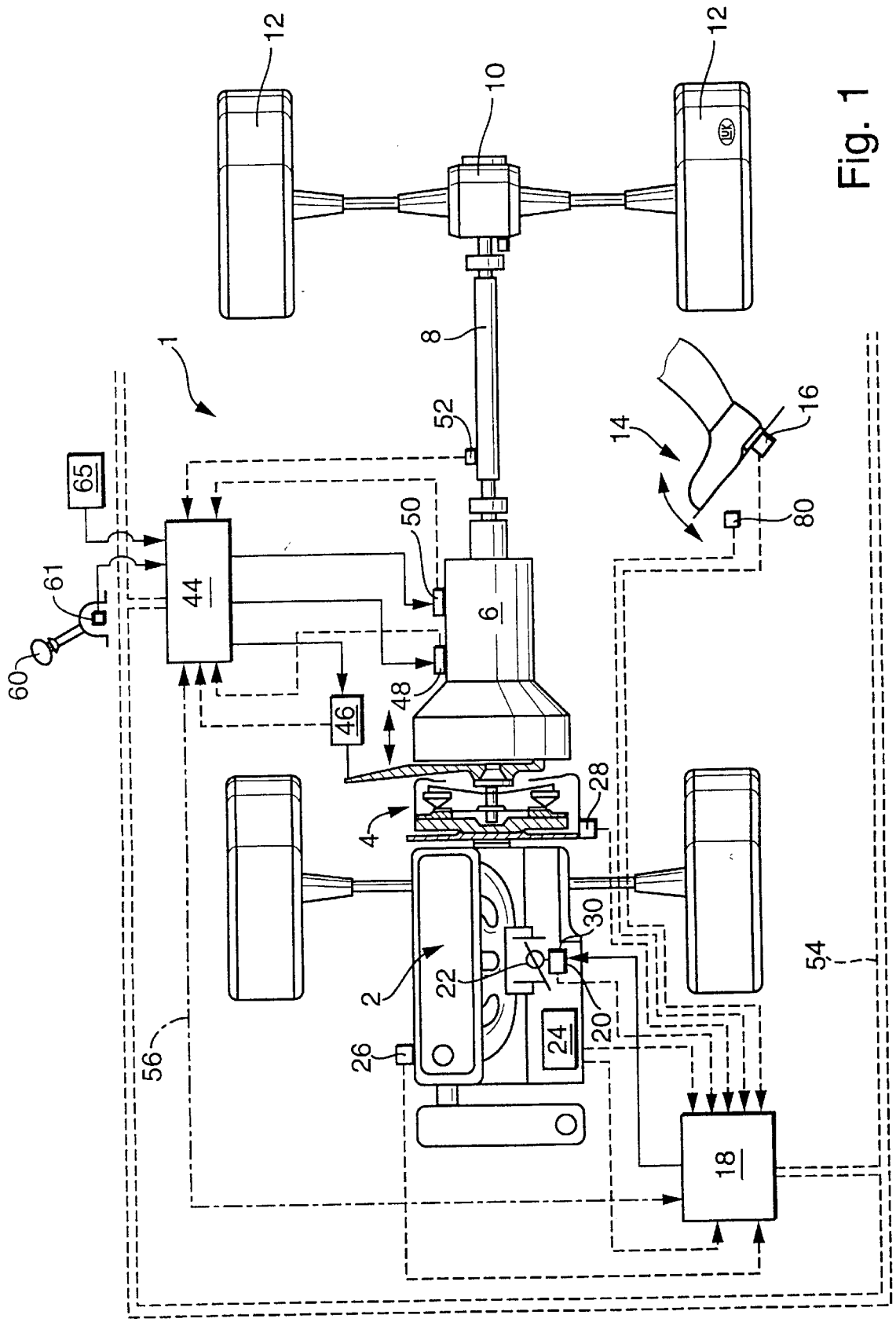
FIG. 1 represents a motor vehicle with a power train, a transmission-actuating device and a control device in a schematic view.

FIG. 1 shows a motor vehicle 1 with a power train containing a combustion engine 2, a clutch 4 and a transmission 6. The wheels 12 of the vehicle 1 are driven by way of a drive shaft 8 and a differential 10. A transmission-ratio selector device 60, such as a selector lever with a sensor 61, and a control device 18, 44 are shown schematically in block-diagram form. The control device 18, 44 can be configured as a single unit or in functionally and/or spatially separated modules.

If the control device 18, 44 is arranged in functionally and/or spatially separated modules, it is possible to connect the modules, e.g., through a CAN-Bus 54 (where CAN stands for "Controller Area Network") or other electrical data communication lines 56.

The device for changing the ratio of the transmission includes at least one actuator 48, 50 and a control device. To change the transmission ratio, the control device sends a command to the actuator. The clutch 4, likewise can be operated automatically by means of the actuator 46.

The portion 44 of the control device receives signals that represent at least in part the state of engagement of the clutch 4 and the currently set ratio of the transmission. Further signals arrive from the sensor 61 of the ratio-selector device 60, and from an electronic device 65. In a preferred embodiment, the communication device 65 is a communication device, in particular a mobile telephone.

The portion 18 of the control device controls the combustion engine 2 by varying the aperture of the throttle valve 30. The signals received by the portion 18 of the control device include an intake vacuum signal from a sensor 26, a coolant temperature signal from a sensor 24, an engine rpm signal from a sensor 28, a throttle-aperture signal from a sensor 22, and a position signal from a sensor 16 connected to a gas pedal 14.

Figure 2:
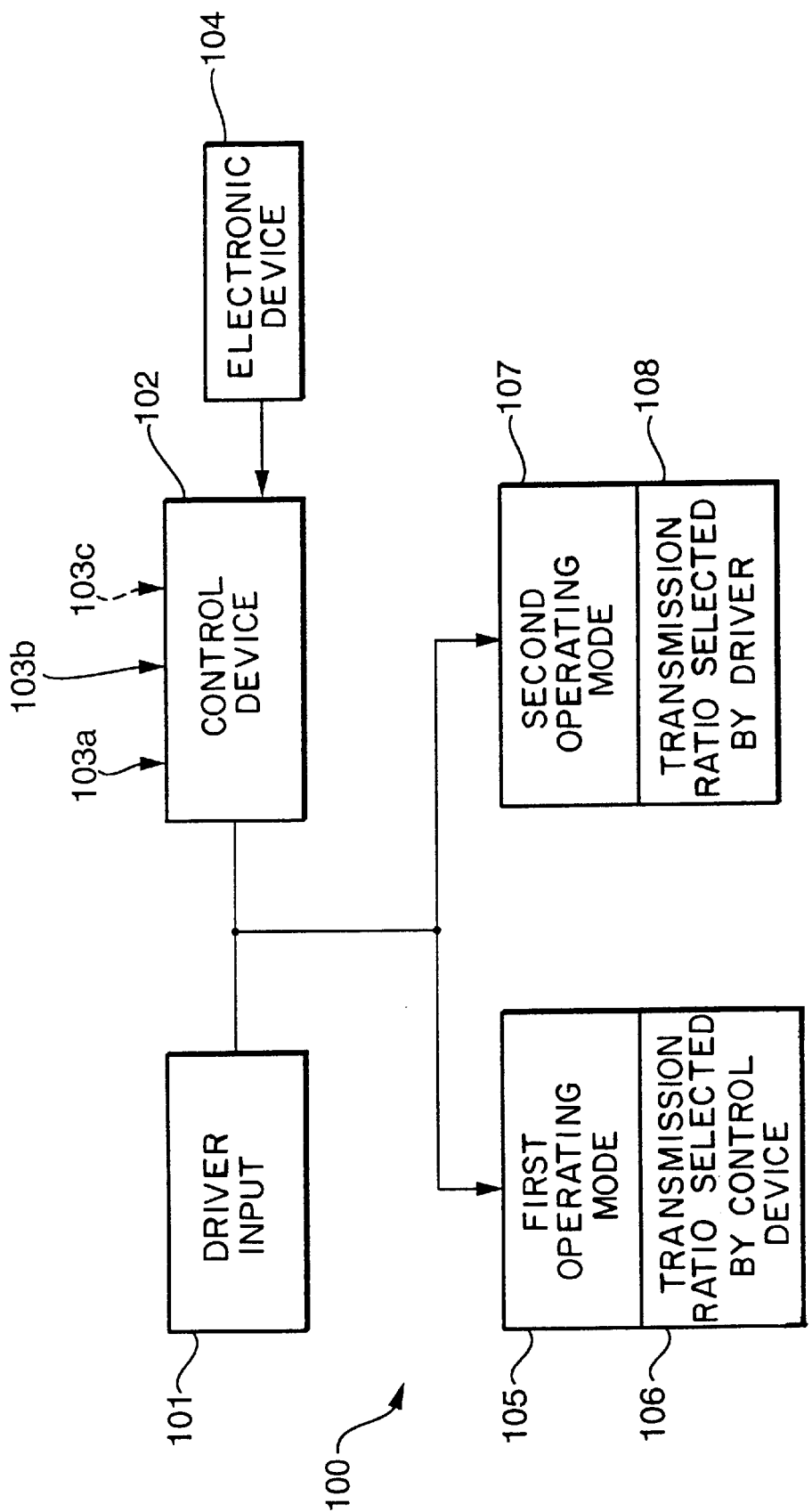
FIG. 2 represents a diagram to illustrate the switching between operating modes.

The diagram 100 of FIG. 2 illustrates the selective switching between operating modes. The switch-over can occur as a result of a conscious action taken by the driver, e.g., by way of a switching element (Block 101), or it can occur automatically as directed by the control device (Block 102). The control device 102 receives a multitude of signals, only three of which (103a, 103b, and 103c) are shown as examples. Among the multitude of signals represented by the signals 103a, 103b, 103c and other signals not represented in FIG. 2, at least one signal is triggered by an electronic device represented by block 104. The signal triggered by block 104 initiates a first operating mode (blocks 105, 106) in which the transmission ratio is selected automatically by the control device or a second operating mode (blocks 107, 108) in which the transmission ratio is selected manually by the driver.

Figure 3:
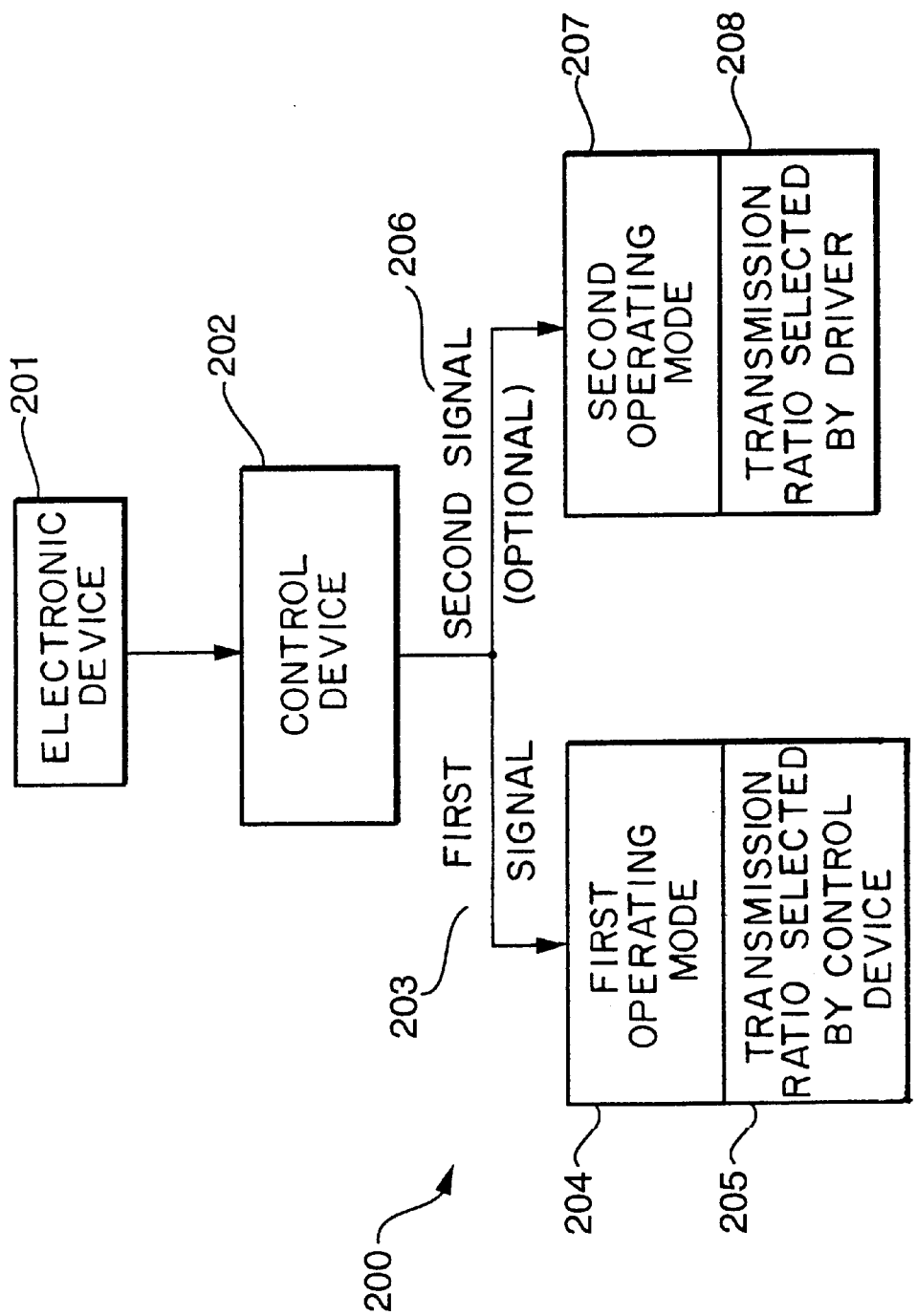
FIG. 3 represents a diagram to illustrate the automatic switching between operating modes performed by the control device.

The diagram 200 of FIG. 3 illustrates how the operating mode is selected by the control device (Block 202). The control device 202 receives among other inputs at least one signal, preferably a first signal, and optionally a second signal from an electronic device symbolized by block 201. Based on the signals received, the control device 202 switches the transmission to the first operating mode 204 corresponding to a first signal 203, or to the second operating mode 207 corresponding to a second signal 206. Under the first operating mode 204, transmission-ratio changes are controlled by the control device (block 205), while under the second operating mode 207, transmission-ratio changes are controlled by the driver (block 208).

The electronic device symbolized by block 201 can be, for example, a communication device such as a mobile telephone that is configured as a stand-alone instrument or integrated in the motor vehicle, e.g., as part of an entertainment and/or information system that may include components such as a navigation device, a car radio, and a cassette- and/or CD-player.

The signals that are sent from the mobile telephone 201 to the control device 202 are preferably signals that indicate the beginning or end of a telephone conversation. The switch-over between operating modes, which can also be referred to as automatic and manual mode, occurs preferably in a manner where the automatic mode is selected at the beginning of a telephone conversation and the manual mode is selected at the end of a telephone conversation.

If the transmission has already been set for the automatic mode before the telephone call was started, it is preferred if the control device does not cause a switch-over to the manual mode at the end of the call. In a further embodiment, the control device leaves the transmission in the automatic mode even if it was in manual mode at the start of the telephone call. The latter embodiment has the advantage that only one signal is needed, i.e., a first signal which indicates the start of a telephone conversation and initiates the switch-over to the automatic operating mode.

The beginning of a telephone conversation can be detected when the telephone is ringing because of an incoming call, when the driver accepts the call, when an outgoing call is dialed, or when the mobile telephone is taken out of a holder. The end of a call is detected, e.g., when the connection is terminated either by the driver or by the other party, or when the mobile telephone is set back into its holder. It is also possible to rely on the same signal that is used to turn off the sound on an entertainment- and/or information system (a so-called "mute" feature) or on the signal that is used to optically announce a telephone call.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A motor vehicle comprising an engine, a transmission with a device for changing a transmission ratio, a control device, and a ratio-selector device, wherein the transmission has a first operating mode in which a change of the transmission ratio is initiated by the control device, and a second operating mode in which the change of the transmission ratio is initiated by the ratio-selector device, and wherein a switch-over between said operating modes can be performed automatically by the control device;

wherein the control device performs the automatic switch-over in response to at least one signal; and wherein the at least one signal comprises a first signal causing a switch-over to the first operating mode and an optional second signal causing a switch-over to the second operating mode.

2. The motor vehicle of claim 1, wherein the first signal and the second signal are generated by an electronic device.

3. The motor vehicle of claim 2, wherein the electronic device comprises a communication device.

4. The motor vehicle of claim 3, wherein the communication device comprises a mobile telephone.

5. A motor vehicle comprising:

an engine, a transmission with a device for changing a transmission ratio, a control device, and a ratio-selector device, wherein the transmission has a first operating mode in which a change of the transmission ratio is initiated by the control device, and a second operating mode in which the change of the transmission ratio is initiated by the ratio-selector device, and wherein a switch-over between said operating modes can be performed automatically by the control device;

wherein the control device performs the automatic switch-over in response to at least one signal;

wherein the at least one signal comprises a first signal causing a switch-over to the first operating mode and a second signal causing an optional switch-over to the second operating mode; and wherein the second signal does not cause the optional switch-over if the transmission was set to the first operating mode already before the first signal occurred.

6. A motor vehicle comprising an engine, a transmission with a device for changing a transmission ratio, a control device, and a ratio-selector device, wherein the transmission has a first operating mode in which a change of the transmission ratio is initiated by the control device, and a second operating mode in which the change of the transmission ratio is initiated by the ratio-selector device, and wherein a switch-over between said operating modes can be performed automatically by the control device; and wherein a transmission ratio selected under the first operating mode remains in effect during a switch-over to the second operating mode.

7. A motor vehicle comprising an engine, a transmission with a device for changing a transmission ratio, a control device, and a ratio-selector device, wherein the transmission has a first operating mode in which a change of the transmission ratio is initiated by the control device, and a second operating mode in which the change of the transmission ratio is initiated by the ratio-selector device, and wherein a switch-over between said operating modes can be performed automatically by the control device;

wherein the at least one signal comprises a first signal causing a switch-over to the first operating mode and a second signal causing a switch-over to the second operating mode, the first signal and the second signal being generated by an electronic device that comprises a communication device in the form of a mobile telephone; and wherein the first signal is at least representative of one of the set of situations consisting of an incoming telephone call, an outgoing telephone call, an intent of the driver to make a telephone call, and an intent of the driver to answer a telephone call.

8. The motor vehicle of claim 7, wherein the second signal is at least representative of one of the set of situations consisting of a telephone call having been completed and of an intent of the driver to end a telephone call.

* * * * *